UNITED STATES PATENT OFFICE 2,289,773

RECOVERY OF OLEFINS

Edwin R. Gilliland, Cambridge, Mass., assignor to Standard Oil Development Company, a corporation of Delaware No Drawing. Application December 29, 1938, Serial No. 248,235

15 Claims. (Cl. 260—677)

This invention relates to improvements in the segregation of unsaturated hydrocarbons, and relates particularly to the separation of olefins having from 2 to 4 carbon atoms to the molecule from the paraffins.

It is known that cuprous salts in solution react with unsaturated hydrocarbons. Berthelot, Ann. Chem. Phys., 23, 32–39 (1901), disclosed that ethylene was absorbed by hydrochloric solutions of cuprous chloride. Manchot and Brandt in 1909 disclosed that ethylene at atmospheric pressure was absorbed by such a solution to the extent of one molecule for each molecule of cuprous chloride, forming a meta-stable compound which is empirically $CuCl.C_2H_4$. Ethylene is also known to react with ammoniacal cuprous chloride solutions, and several patents have been granted for the recovery of ethylene by absorption in ammoniacal solutions.

A reaction of an olefin with solid cuprous chloride was first disclosed by Tropsch and Mattox in the Journal of American Chemical Society, 57, 1102–3 (1935). They disclosed that ethylene reacts with solid cuprous chloride at high pressures, giving an addition compound $CuCl.C_2H_4$ which decomposes slowly at 25° C. and rapidly at 100° C. The equilibrium pressure of ethylene over the compound was disclosed to range from 2.14 atmospheres at 0° C. to 19.49 atmospheres at 40° C. They stated that propylene did not react, and that ethylene could be selectively recovered from mixtures of ethylene and ethane and of ethylene and propylene, but not in stoichiometric proportions.

An object of this invention is to use solid cuprous chloride to segregate and fractionate propylene, isobutylene and other olefins. According to this invention, it was found that propylene will combine mol for mol with solid cuprous chloride, yielding a highly dissociative compound $CuCl.C_3H_6$. Isobutylene was also found to form a similar compound which is believed to be $CuCl.i-C_4H_8$. Therefore, according to this invention, mono-olefins higher than ethylene were found to react with solid cuprous chloride and solid cuprous chloride could be used to separate the mono-olefins from the paraffinic hydrocarbons and also to fractionate mono-olefins having different molecular weights.

It has been found that all the mono-olefins from ethylene to and including the olefins having 4 carbon atoms to the molecule form addition compounds with solid cuprous chloride. These compounds contain one mol of olefin per mol of cuprous chloride and form monovariant systems with the cuprous chloride, i. e., at a given temperature the complex exerts a given partial pressure independent of the percentage of saturation of the cuprous salt. The olefins also form addition complexes with the other cuprous halides and the following table gives the equilibrium dissociation pressure for a few of the complexes with cuprous chloride and cuprous bromide.

| Temperature, °C. | System | | | | |
|---|---|---|---|---|---|
| | $C_3H_6$—CuCl | $C_4H_8$—CuCl | $i$—$C_4H_8$—CuCl | $C_2H_4$—CuBr | $C_3H_6$—CuBr |
| | ABSOLUTE PRESSURE—ATMOSPHERES | | | | |
| 60 | 56 | | | | |
| 40 | 20 | | | | |
| 20 | 6.9 | 10 | | 50 | |
| 10 | 3.8 | 5.2 | | 30 | |
| 0 | 2.0 | 2.5 | | 18 | |
| −20 | 0.4 | 0.44 | 0.5 | 5 | 2.2 |
| −40 | 0.07 | 0.07 | 0.08 | 1.3 | 0.53 |
| −60 | 0.02 | | | 0.24 | 0.08 |

The above table reveals that for cuprous chloride, the equilibrium partial pressures of all the olefins are very nearly equal but that the complexes with the bromide have much higher pressures at a given temperature than do the chlorides. The iodides were found to give still higher decomposition pressures.

The monovariancy of these systems makes them particularly useful for obtaining sharp separations. Thus, considering the propylene-cuprous chloride complex, its vapor pressure rises much more rapidly with temperature than does the vapor pressure of liquid propylene. At low temperatures, the complex has a lower pressure than the vapor pressure of propylene but as the temperature is increased, the more rapid increase in the pressure of the complex results in the dissociation pressure equaling the vapor pressure at about 23° C. Under these conditions the system becomes non-variant. At higher temperatures it is not possible to form the complex from gaseous propylene since the dissociation pressure is higher than the vapor pressure and an increase in the propylene pressure simply liquefies the propylene without forming the complex. It is, of course, possible that, by use of extremely high pressures, liquid propylene can be made to react with cuprous chloride at temperatures above 23° C. The corresponding limiting dissociation temperature for the cuprous chloride-butylene complexes is about −20° C., while ethylene does not have such a limiting temperature since in this latter case there is no temperature below the critical temperature of ethylene at which the complex has a higher partial pressure than liquid ethylene and the complexes between ethylene and cuprous chloride can be prepared at temperatures even as high as 80° C. if sufficient pressure is used.

A gaseous mixture containing ethylene, propylene and butylenes together with saturated compounds is treated with solid cuprous chloride at temperatures above 23° C. The only olefin that will be adsorbed will be ethylene and this only if the partial pressure (partial fugacity) is greater than the dissociation pressure of the ethylene complex at the temperature of operation. The complex can then be removed and regenerated either by heating or reduction of pressure. In this way ethylene of high purity can be obtained. At temperatures below 23° C. and above approximately −20° C. ethylene and propylene both could be absorbed, while at temperatures below approximately −20° C. ethylene, propylene and the butylenes would be adsorbed. The limiting temperatures for the cuprous bromide and cuprous iodide complexes are lower than the corresponding limiting temperature for the cuprous chloride complexes, while the temperatures are higher for the cuprous fluoride complexes.

The separation between the olefins and the paraffins is very sharp, the only contamination of the regenerated olefin being the residual gas in the interstices of the solid cuprous chloride and the small amount physically adsorbed on the surface of the cuprous chloride and on the walls of the container. While it is possible to separate the various olefins from one another, this separation between the different olefins is more difficult and it is usually found preferable to fractionate the hydrocarbon gases into $C_2$, $C_3$ and $C_4$ fractions and then treat the fractions separately to recover the olefins.

The other cuprous halides may be used in a similar manner, but the preferred salts are cuprous chloride and cuprous fluoride. The cuprous halides may be used in finely-divided form as such or in admixture with powdered inert materials such as pumice.

Example 1

A mixture containing 48% $C_3H_6$ and 52% $C_3H_8$ was liquefied and treated with solid CuCl at −40° C. for 15 minutes. The solid CuCl employed was 1.5 mols per mol of $C_3H_6$. At the end of this period the unreacted liquid was removed and analyzed, 11.5% $C_3H_6$, 88.5% $C_3H_8$, giving a propylene recovery of 86 mol per cent. The propylene-CuCl compound was regenerated by heating to room temperature, and the purity of the propylene evolved was better than 98%.

Example 2

A mixture containing 42% $C_2H_4$ and 58% $H_2$ was contacted with solid CuCl at 20° C. and 50 atmospheres pressure. 0.693 mol of $C_2H_4$ were absorbed per mol of CuCl and on regeneration of the complex, ethylene of 97% purity was obtained.

Example 3

A mixture containing 48% $C_2H_4$ and 52% $C_2H_6$ was contacted with solid CuCl at 20° C. and 50 atmospheres pressure. 0.515 mol of $C_2H_4$ were absorbed per mol of CuCl and on regeneration of the complex, ethylene of 98% purity was obtained.

This invention is not limited to any specific example or theories, all of which have been presented solely for the purpose of illustration, but is to be limited only by the following claims in which it is desired to claim all novelty insofar as the prior art permits.

I claim:

1. A process for the separation of propylene from propane, which comprises treating the $C_3$ mixture with solid cuprous chloride below 23° C. under sufficient pressure to liquefy the hydrocarbons and to obtain a partial pressure of the olefin treated greater than the dissociation pressure of the cuprous halide-olefin complex at the temperature of treatment in order for formation of the complex to occur, removing the unreacted liquid and regenerating the propylene from the complex thus obtained.

2. A process for the separation of propylene from propane, which comprises treating the $C_3$ mixture with solid cuprous chloride at temperatures below 23° C., under a total sufficient to give a partial pressure of propylene greater than the dissociation pressure of the resulting cuprous chloride propylene complex under the conditions of treatment, removing the unreacted gases and regenerating the propylene from the said complex.

3. A process for separating butylenes from butanes, which comprises treating the $C_4$ mixture with solid cuprous chloride at temperatures below −20° C. under a total pressure sufficient to liquefy the hydrocarbons and to obtain a partial pressure of the olefin treated greater than the dissociation pressure of the cuprous halide-olefin complex at the temperature of treatment in order for formation of the complex to occur, removing the unreacted liquid and regenerating the butylene from the resulting cuprous chloride-butylene complex by increase in temperature.

4. A process for the separation of propylene from propane, which comprises treating the $C_3$ mixture with solid cuprous bromide at temperatures below −20° C. under sufficient pressure to liquefy the hydrocarbons and to obtain a partial pressure of the olefin treated greater than the dissociation pressure of the cuprous halide-olefin complex at the temperature of treatment in order for formation of the complex to occur, removing the unreacted liquid and regenerating the propylene from the resulting cuprous bromide-propylene complex.

5. A process for the separation of propylene from propane, which comprises treating the $C_3$ mixture with solid cuprous bromide at temperatures below −20° C., under a total pressure sufficient to give a partial pressure of propylene greater than the dissociation pressure of the resulting complex at the temperature of treatment, but less than the vapor pressure of the mixture, removing the unreacted gases and regenerating the propylene from the said complex.

6. A process of separating mono-olefins having 3 carbon atoms to the molecule from saturated hydrocarbons, which comprises contacting a mixture of mono-olefins having 3 carbon atoms to the molecule and saturated hydrocarbons with a solid cuprous chloride salt at a temperature not over 23° C. and a pressure sufficient to give a partial pressure of propylene which is greater than the dissociation pressure of the resulting cuprous halide-propylene complex under the conditions of treatment, separating the cuprous chloride complex salt from the unreacted hydrocarbons and subjecting the cuprous chloride complex to an elevated temperature to vaporize propylene.

7. A process of segregating mono-olefins from saturated hydrocarbons, which comprises fractionating a mixture of olefins and saturated hydrocarbons having from 2 to 4 carbon atoms to the molecule into fractions composed of hydrocarbons having the same number of carbon atoms to the molecule, contacting the fraction having 3 carbon atoms to the molecule with a solid cuprous chloride salt at a temperature between —20° to 23° C. and a pressure sufficient to give a partial pressure of propylene which is greater than the dissociation pressure of the resulting cuprous halide-propylene complex under the conditions of treatment, separating the cuprous chloride complex from the unreacted hydrocarbons and heating the separated cuprous chloride complex to a temperature above 23° C. to recover propylene.

8. A process of separating propylene from saturated hydrocarbons, which comprises contacting a mixture of propylene and saturated hydrocarbons having 3 carbon atoms to the molecule with a solid cuprous chloride salt at a temperature between —20° and 23° C. and a pressure sufficient to give a partial pressure of propylene which is greater than the dissociation pressure of the resulting cuprous halide-propylene complex under the conditions of treatment, separating the cuprous chloride complex from the unreacted hydrocarbons and subjecting the cuprous chloride complex to an elevated temperature to recover propylene.

9. A process of separating butylenes from saturated hydrocarbons having 4 carbon atoms to the molecule, which comprises contacting a mixture of butylene and saturated hydrocarbons having 4 carbon atoms to the molecule with a solid cuprous chloride salt at a temperature not over —20° C. and a pressure sufficient to give a partial pressure of butylenes which is higher than the dissociation pressure of the resulting cuprous halide-butylene complex under the conditions of treatment, separating the cuprous chloride complex from the unreacted hydrocarbons and subjecting the cuprous chloride complex to an elevated temperature to recover the butylenes.

10. A process for the separation of propylene from isobutylene which comprises contacting with solid cuprous chloride a mixture of propylene and isobutylene at a temperature between 23° and —20° C. and a pressure providing a partial pressure of propylene which is greater than the dissociation pressure of a solid cuprous chloride-propylene complex at the treating temperature, separating the resulting complex from unreacted hydrocarbons and then releasing propylene from the complex.

11. A process for the separation of olefins of 2 to 4 carbon atoms per molecule from a mixture of said olefins and saturated hydrocarbons of the same boiling range which comprises contacting said mixture with solid cuprous chloride at a temperature below —20° C. and a pressure providing partial pressures of said olefins which are greater than the dissociation pressures of the corresponding solid cuprous chloride complexes with the said olefins at the treating temperature, separating the resulting complexes from unreacted hydrocarbons and then releasing the absorbed olefins from the complexes.

12. A process for the separation of an olefin of 3 to 4 carbon atoms per molecule from a mixture of said olefin and a saturated hydrocarbon of the same boiling range which comprises contacting said mixture with solid cuprous chloride at a temperature below the limiting dissociation temperature of a solid cuprous chloride complex with the said olefin and at a pressure providing a partial pressure of said olefin which is greater than the dissociation pressure of said complex at the treating temperature, thereby securing an addition complex of said solid cuprous chloride and said olefin, separating this addition complex from unreacted hydrocarbons and then releasing the absorbed olefin from said addition complex.

13. A process for the separation of fluid olefins containing more than two carbon atoms to the molecule from paraffins, which comprises contacting a mixture of said paraffins and said olefins with solid anhydrous cuprous halides at a temperature below the limiting dissociation temperature of the complex formed between the cuprous halide salt and the olefin being treated and pressure sufficient to give a partial pressure of the olefin to be absorbed which is greater than the dissociation pressure of the resulting cuprous halide-olefin complex at the treating temperature, separating said complex from unreacted material and regenerating the olefins from said complex.

14. A process for the separation of fluid olefins containing more than two carbon atoms to the molecule from saturated hydrocarbons of the same boiling range, which comprises contacting the mixture with solid anhydrous cuprous halides at a temperature below the limiting dissociation temperature of the complex formed between the cuprous halide salt and the olefin being treated and pressure sufficient to give a partial pressure of the olefin to be absorbed which is greater than the dissociation pressure of the resulting cuprous halide-olefin complex at the treating temperature, removing the unreacted hydrocarbons from the said complex and regenerating the olefins from the said complex.

15. A process of separating mono-olefins having three carbon atoms to the molecule from saturated hydrocarbons, which comprises contacting a mixture of mono-olefins having 3 carbon atoms to the molecule and saturated hydrocarbons with a solid cuprous halide salt at a temperature below that at which the dissociation pressure of the complex is equal to the partial pressure of the olefin and at a pressure so that the partial pressure of the olefin in the mixture being treated is greater than the dissociation pressure of the corresponding cuprous halide complex at the treating temperature, separating the cuprous halide complex from the unreacted hydrocarbons and subjecting the cuprous halide complex to an elevated temperature to recover propylene.

EDWIN R. GILLILAND.